Aug. 25, 1942.   G. F. ERICKSON   2,293,723
PHONOGRAPH
Filed June 14, 1940   8 Sheets-Sheet 1

Inventor.
Gustav F. Erickson
BY
Roland L. Rehm
Atty

Aug. 25, 1942.　　　G. F. ERICKSON　　　2,293,723
PHONOGRAPH
Filed June 14, 1940　　　8 Sheets-Sheet 2

Inventor:
Gustav F. Erickson
By Roland C. Rehm
Atty

Aug. 25, 1942.   G. F. ERICKSON   2,293,723
PHONOGRAPH
Filed June 14, 1940   8 Sheets-Sheet 3

Fig.5

Inventor:
Gustaf F. Erickson
By:
Roland C. Rehm
Atty

Aug. 25, 1942.   G. F. ERICKSON   2,293,723
PHONOGRAPH
Filed June 14, 1940   8 Sheets-Sheet 5

Inventor
Gustav F. Erickson
BY Roland C. Rehm
Atty.

Aug. 25, 1942.  G. F. ERICKSON  2,293,723
PHONOGRAPH
Filed June 14, 1940  8 Sheets-Sheet 6

Inventor:
Gustav F. Erickson
By-
Roland C. Rehm
Atty

Aug. 25, 1942.        G. F. ERICKSON        2,293,723
PHONOGRAPH
Filed June 14, 1940        8 Sheets-Sheet 7

Inventor:
Gustav F. Erickson
By
Roland C. Rehm
Atty

Patented Aug. 25, 1942

2,293,723

UNITED STATES PATENT OFFICE 2,293,723

PHONOGRAPH

Gustav F. Erickson, Chicago, Ill., assignor to James E. Johnson, Chicago, Ill.

Application June 14, 1940, Serial No. 340,418

5 Claims. (Cl. 274—10)

This invention relates to phonographs and, among other objects, aims to provide a simple and improved phonograph for making records and for supplying successive record blanks to and removing completed records from the record making mechanism.

The nature of the invention may be readily understood by reference to one illustrative phonograph embodying the invention and shown in the accompanying drawings.

The illustrative apparatus represents only one practical application of the invention. In this instance the apparatus is coin controlled and operates upon deposit of a coin to make a sound recording on a record and to deliver the same upon completion. The recording is of standard character and the record may be played on any standard phonograph. Before delivery the present apparatus automatically plays the record for the benefit of the operator or for other purposes. A complete cycle, therefore, includes making (on a blank previously placed in the recording apparatus) a record from sound impulses, in this instance electrically transmitted to the recording apparatus, playing of the completed record, removal of the record from the recording mechanism, and delivery thereof. An important operation of general application is the removal of the cuttings or shavings (produced by the cutting stylus during the making of the record) to prevent interference with any portion of the apparatus.

Figure 4:
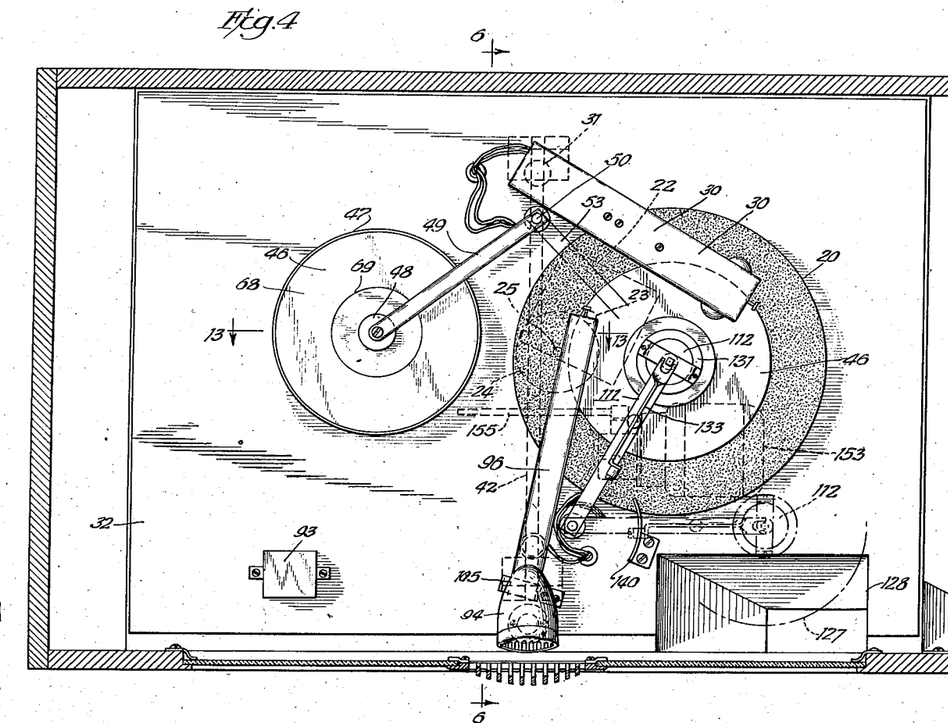
Fig. 4 is a plan view (taken approximately from the plane 4—4 of Fig. 1) of the phonographic apparatus.
Figure 5:
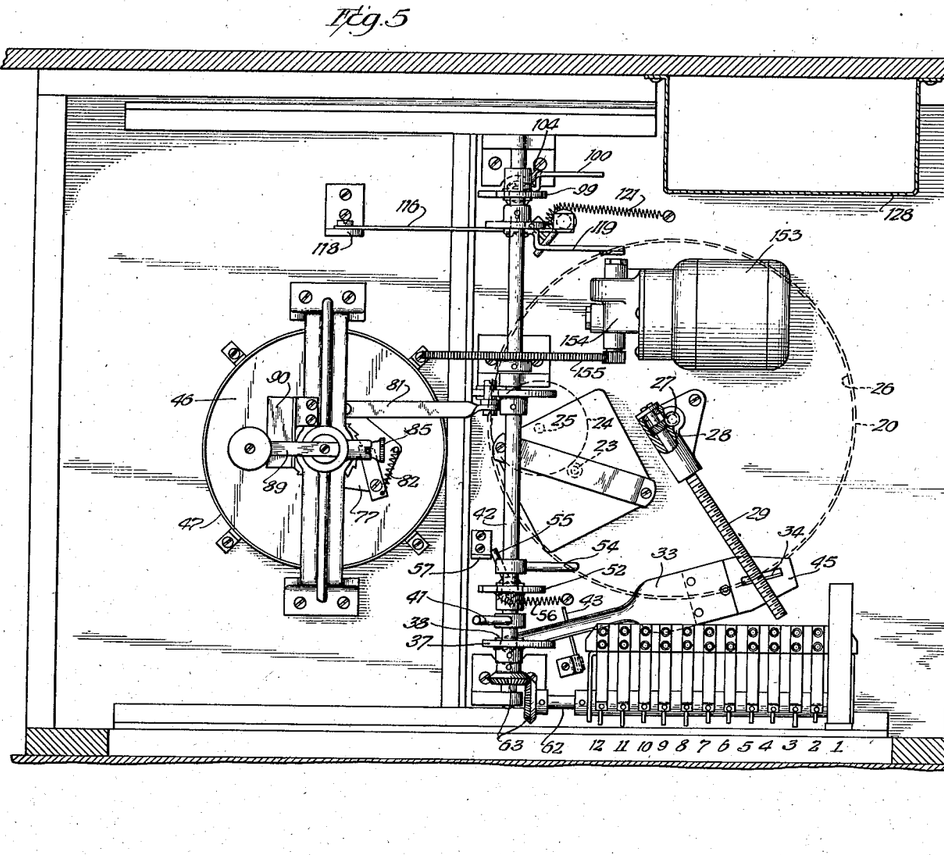
Fig. 5 is a bottom plan view of the same apparatus taken approximately from the plane 5—5 of Fig. 1.
Figure 6:
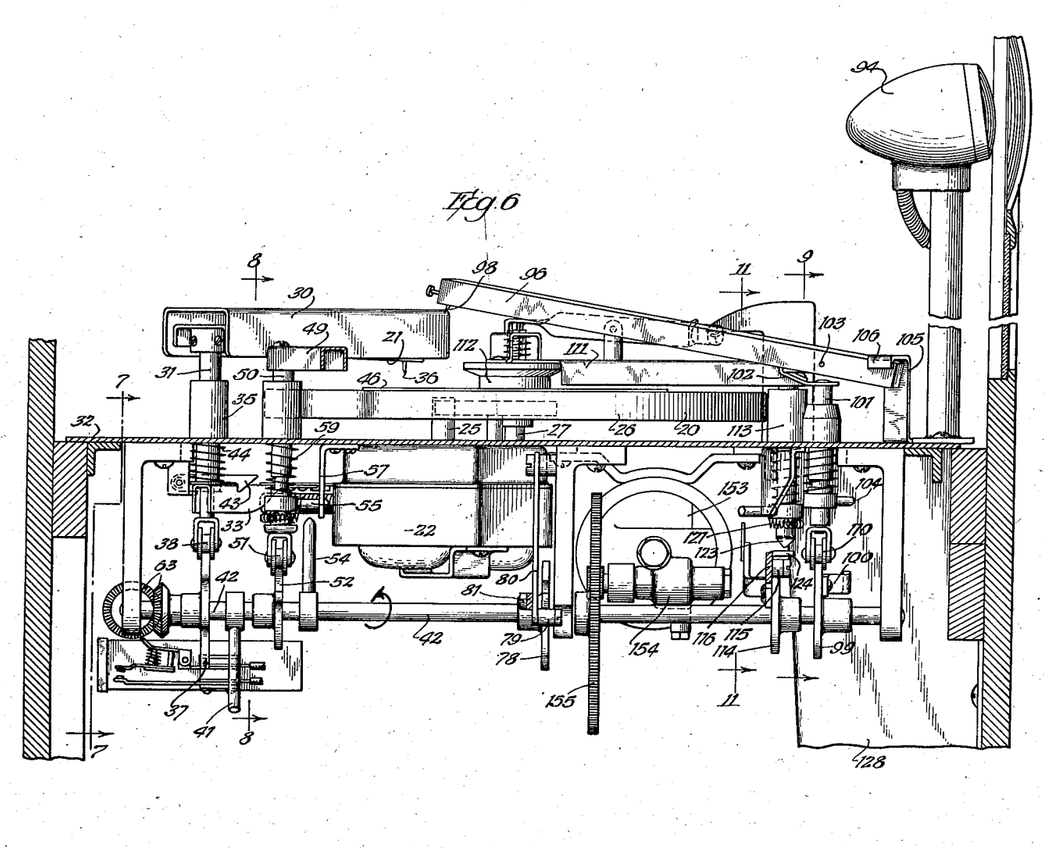
Fig. 6 is a sectional elevation of the phonographic apparatus taken on the plane 6—6 of Fig. 4.
Figure 7:
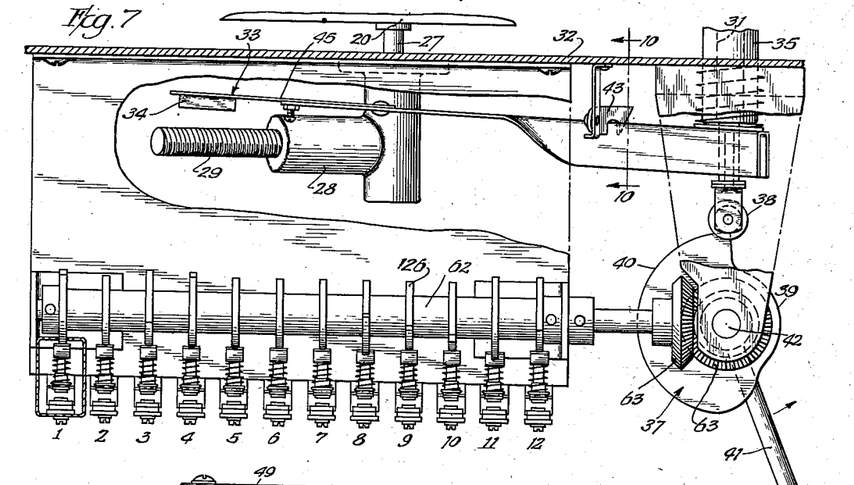
Fig. 7 is an elevation of details of the phonographic apparatus taken from the plane 7—7 of Fig. 6, and particularly the mechanism for returning the cutting head to initial position.

The recording apparatus may advantageously be of standard design including a conventional motor driven turntable 20 and a cutting head or stylus 21 (Figs. 4, 5 and 6). The illustrative recording mechanism is driven by a synchronous motor 22 which rotates, through appropriate reduction gearing 23, a friction driving disc 24 mounted on shaft 25 and engaging the inner face of the skirt or rim 26 on the turntable. The shaft 27 on which the turntable is mounted is in this instance employed to drive (through reduction gearing 28) a worm 29 (Fig. 5) for advancing the stylus or cutting head arm 30 at the proper rate (in this case from the periphery toward the center of the disc) during the recording operation. The shaft 31 carrying the cutting head arm 30 extends downwardly through the top plate 32 and carries a swinging arm 33 provided with a fin 34 adapted operatively to engage and be moved by the rotation of worm 29. Shaft 31 is vertically slidable in its bearing 35 to lift the head and its cutting stylus 36 from the record and simultaneously to disengage the swinging arm 33 from worm 29 to permit return of the cutting head to initial position. The lifting operation is here effected by a cam 37 acting on cam roller 38 carried at the lower end of shaft 31. During the recording operation, shaft 31 is in its lower position with roller 38 riding on the low portion 39 of cam 37. Upon completion of the recording operation, the high part 40 of cam 37 is rotated to elevate shaft 31 and parts connected thereto. When the cutting head and its swinging arm 33 are thus elevated, they are swung to their initial positions by operating mechanism here represented by a pin 41 carried on control shaft 42 (on which cam 37 is also mounted). When the leading edge of the high portion 40 of the cam engages roller 38 and raises the swinging arm and the cutting head, pin 41 engages the side of arm 33 (opposite that shown in Fig. 7) to move it outwardly to initial position, in which position it is held by latch 43. Pin 41 is made of such length as to clear the lower edge of arm 33 when the latter is swung to its outer position. The cutting head remains elevated by the high portion 40 of cam 37 until the beginning of a recording cycle at which time the cutting stylus is lowered into contact with the record and the fin 34 operatively engages driving worm 29. Arm 33 becomes disengaged from latch 43 when it is lowered as aforesaid. A spring 44 (Fig. 7) insures the downward movement of arm 33 and its cutting head at the proper time in the cycle. The swinging arm 33 is advantageously made flexible (in this instance by means of a leaf spring 45) in a vertical but not transverse direction, and the swinging arm is thereby prevented from interfering with proper pressure of the cutting stylus 36 on the record.

Control shaft 42, on which cam 37 is mounted, carries other cams (presently described) for sequentially controlling other operations of the apparatus. In this case, it makes a single revolution (in a counterclockwise direction) for each complete cycle.

Record blanks 46 are supplied from magazine 47 wherein they are stacked in this instance in contact with each other. The mechanism for transferring a record from the magazine to the turntable 20 is here shown in the form of an electromagnetic lifting device 48 carried on oscillating arm 49. Arm 49 is mounted on a vertically slidable shaft 50, the lower end of which is provided with a cam roller 51 riding upon cam 52 mounted on control shaft 42. Arm 49 is moved from its position above the magazine to position 53 above the turntable 20 by an operating device in the form of a pin 54 rotating with shaft 42 and adapted to engage a projection (the pin 55) carried on shaft 50. Arm 49 is moved in the reverse direction by a helical spring 56, partly wound around the lower end of shaft 50. The arm is arrested in position above the magazine by engagement of pin 55 with stop 57. In this position the electromagnetic lifting device 48 registers substantially with the center of a record disc and when the low portion 58 of cam 52 reaches roller 51, spring 59 lowers the electromagnetic device into contact or substantially into contact with the upper record blank in the magazine.

The record blanks, or at least their central portions, are made magnetic and by means of such magnetic central portions the blank may be lifted by the magnet 48 when the latter is energized. Elevation of shaft 50 and swinging of the arm 49 to position 53 carries a blank into register with turntable 20, at which time the record is lowered into close proximity with the turntable and the magnet 48 is then deenergized, allowing the blank to settle on the turntable with the turntable centering pin 60 projecting through the central hole 61 of the record blank.

Magnetic carrying of the blanks permits the use of very thin blanks carried in contact with each other in the magazine. The transfer and carrying mechanism is thus greatly simplified as compared with other recording transferring mechanisms.

Energization and deenergization of magnet 48 is controlled by switch 8 (Figs. 7 and 16) and the latter is opened and closed in this instance by a cam on auxiliary control shaft 62. The latter is rotated synchronously with control shaft 42, in this case by bevel gears 63. The electromagnetic device 48 may advantageously be energized by low voltage direct current supplied by an inexpensive rectifier or "power pack" 64 energized by commercial 110 volt alternating current.

Figure 8:
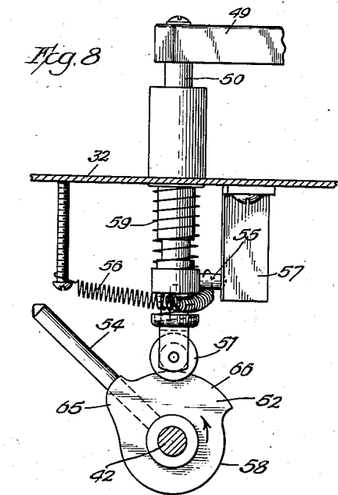
Fig. 8 is an elevation of the operating devices for the record blank carrier.

Actuating cam 52 (Fig. 8) is designed and located on shaft 42 to effect the record transfer operation when the cutting stylus is in elevated position. The elevating and swinging operation of the arm occurs when the high portion 65 of the cam engages a roller 51. At about the time this occurs, switch 8 is closed and the magnet is energized. At the completion of the swinging movement, cam roller 51 rides down on the lower portion 66 of the cam (lowering the record blank over the turntable) at which time magnet 48 is deenergized to release the blank and spring 56 returns the transfer arm to initial position (pin 54 having cleared pin 55).

The field of magnet 48 is adjusted by a rheostat 67 to such strength as will pick up only a single record, leaving the subjacent record blank undisturbed.

In the present instance the records are made of a relatively thin gauge of sheet iron having a coating 68 in which the cutting stylus 36 makes the sound record. The coating may advantageously terminate at 69 just beyond the farthest inward travel of the cutting stylus. Only the portion of the record engaged by the electromagnet 48 need be magnetic. Sheet iron, however, besides being magnetic provides a relatively thin and rigid blank material at low cost. The illustrative blanks are made from 26 gauge (.018") metal.

The stack of record blanks in the magazine is advantageously advanced each cycle by approximately the thickness of a blank. The advancing mechanism is here shown in the form of a follower 71 against which the blanks rest. Screw 72, on which the follower is carried, is advanced by rotation of a ratchet nut 73. The ratchet teeth 74 on the latter are engaged by a pawl 75 pivoted at 76 on an arm 77 oscillating about screw 72. Pawl oscillating means is represented by cam 78 on control shaft 42, which in this instance effects four oscillations for each revolution of the shaft. Cam 78 engages cam roller 79 on swinging arm 80 which is connected to pawl arm 77 by link 81. Pawl 75 is held in operative engagement with the ratchet teeth by spring 82.

Figures 13, 14, 15:
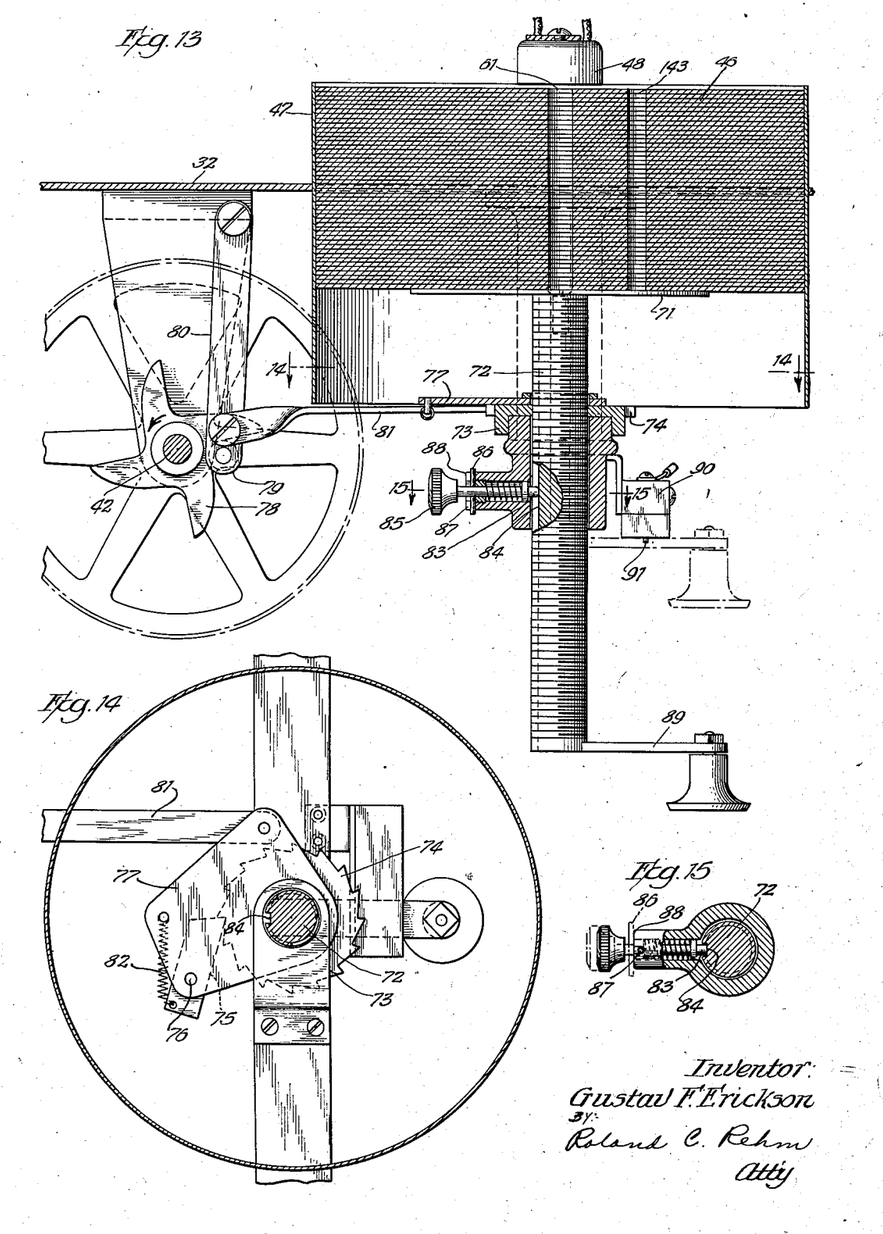
Fig. 13 is an elevation of the record blank magazine and its feeding mechanism.
Fig. 14 is a bottom plan view of such mechanism taken from the plane 14—14 of Fig. 13.
Fig. 15 is a section of a detail taken on the plane 15—15 of Fig. 13.

Screw 72 is held against rotation by a retractable pin 83 travelling in a groove 84 in the screw. The pin may be retracted by a thumb button 85 and temporarily held in such retracted position by rotating the cross pin 86 (after withdrawal from its slot 87) to engage the shoulder 88 (Fig. 15). When thus retracted, screw 72 may be rotated (in this instance by crank arm 89) to lower the follower 71 approximately when additional record blanks are supplied to the magazine.

The magazine is advantageously provided with a signalling device in the form of a micro-switch 90 to signal when the magazine is empty. In the present instance the switch button 91 is engaged by crank arm 89 when the latter reaches the upper limit of its travel to actuate a signal 92, here represented by a light signal bearing the legend "magazine empty." This signal, together with other signals (presently described) employed in the operation of the apparatus, is located in a holder 93 in position to be seen by the operator.

In the present apparatus the sound vibrations to be recorded are electrically delivered to the cutting stylus 36. The sound vibrations are picked up by microphone 94 of conventional design (in this case a so-called crystal microphone) amplified in conventional amplifying apparatus 95, and delivered to the cutting stylus.

Figure 9:
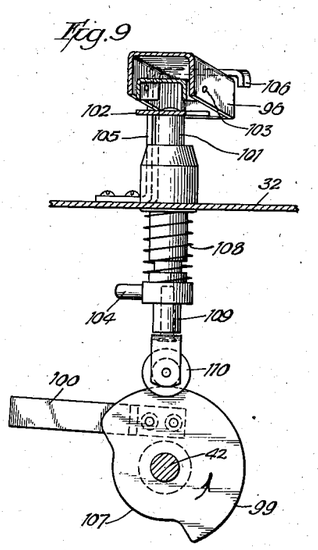
Fig. 9 is an elevation of the mechanism for raising and returning the tone or playing arm to initial position.
Figure 10:
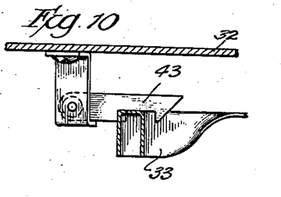
Fig. 10 is a detail showing a latch for holding the cutting head in initial position.

The present apparatus is also provided with "play-back" mechanism for reproducing the recording. Such mechanism is here shown in the form of a so-called tone arm 96 and a receiver, in this instance a loud speaker 97. The vibrations imposed on the pick-up needle 98 are transmitted electrically to the amplifying apparatus 95 from which they are delivered appropriately amplified to the loud speaker. The latter preferably is provided with volume control device by which the operator may control the volume of the sound delivered. In the present apparatus the tone arm 96 is placed in and out of operation automatically by devices actuated by control shaft 42. Such mechanism is represented by an elevating cam 99 and a swinging arm 100, both mounted on and driven by a control shaft 42 (Figs. 6 and 9). Cam 99 operates to elevate tone arm 96 and hold the same in elevated position until the same is lowered to engage a record. The tone arm oscillates about a vertically slidable shaft 101 to which it is pivoted for vertical movement. The pivot connection is here shown in the form of a bent metal clip 102 connected at one end to shaft 101 and carrying at its other end the transverse pivot pin 103. Upon completion of the playing operation, tone arm 96 is elevated by cam 99 and at approximately the same time is swung to initial position by engagement of arm 100 with a projection 104 extending laterally from shaft 101. When in initial position, arm 100 clears projection 104. A stop 105 locates the arm in initial position. The stop also advantageously carries a limiting stop 106 which limits the travel of the arm toward the center of the disc and prevents the same from swinging substantially beyond the playing zone of the record.

Cam 99 carries a low portion 107 so oriented that it permits the lowering of tone arm (under action of spring 108) into playing contact with the record upon completion of the recording operation. Shaft 101 is pivoted at 109 to its cam roller 110 to permit the former to rotate freely as the playing arm follows the record. During playing, arm 100 lies clear of the path of movement of projection 104 on shaft 101.

Upon completion of the playing of the record, the tone arm is raised as aforesaid and returned to initial position where it remains in elevated position until the beginning of the next playing cycle. It should be noted that the stop 105 functions in conjunction with the lifting of shaft 101 to elevate arm 96 about its transverse pivot 103.

Figures 11, 12:
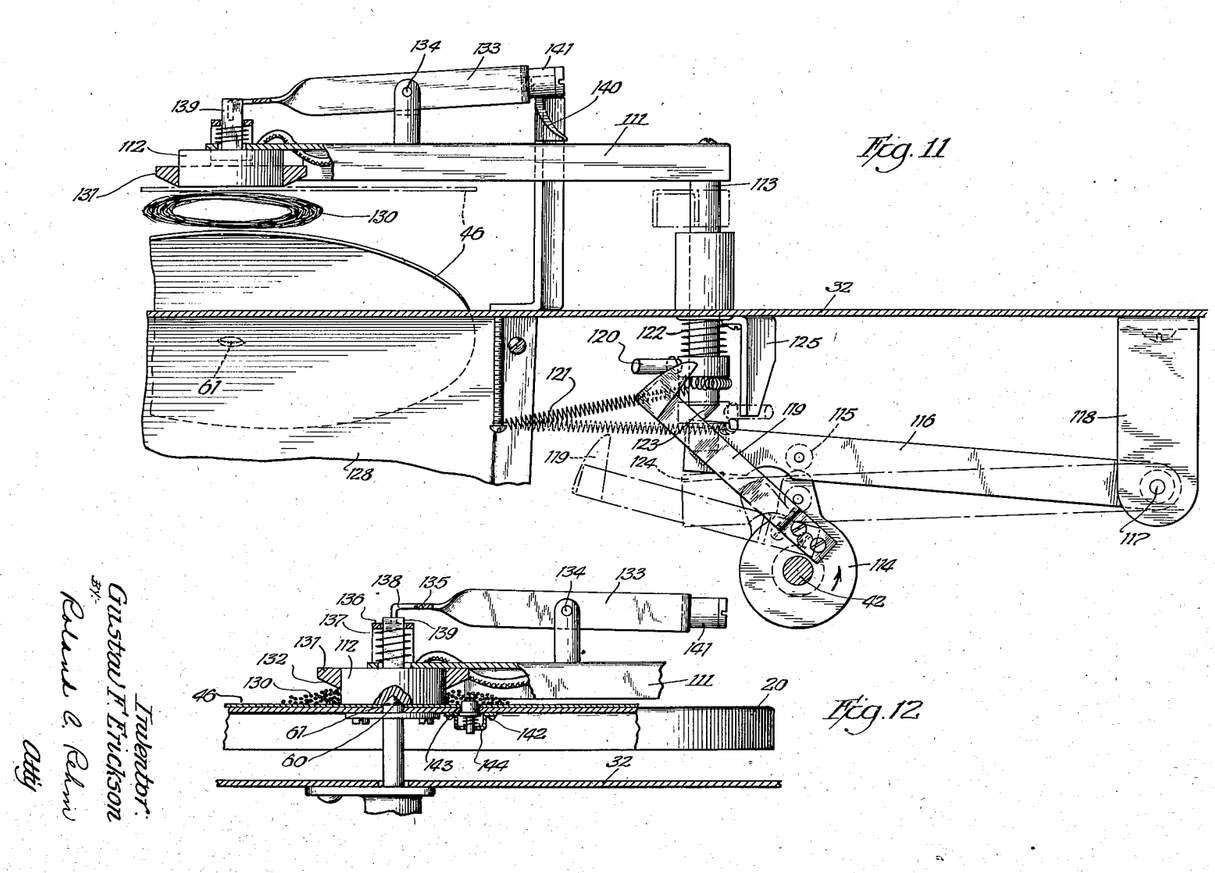
Fig. 11 is an elevation of the record removing and cuttings discharge mechanism.
Fig. 12 is a portion of such mechanism in initial position.

In the present phonograph the completed record is then automatically removed from the turntable and delivered to the operator by mechanism next described. Such mechanism is here shown in the form of a swinging arm 111 carrying an electromagnet 112 by means of which the record is lifted from the turntable and transferred to the delivery point (Figs. 4, 11 and 12). Arm 111 is carried on vertically slidable pivot shaft 113 with which are associated the arm actuating devices. Vertical movement is effected by cam 114 (on control shaft 42) against which bears cam roller 115 on lever 116 (Fig. 11). Link 116 is pivoted at 117 to bracket 118 and serves to transmit vertical movement to shaft 113 (Fig. 11). Swinging movement of delivery arm 111 is effected by engagement of cam arm 119 with a pin 120 projecting laterally from shaft 113. Cam arm 119 rotates with control shaft 42 being here shown connected to the side of cam 114. An elongated helical spring 121 partially winding around shaft 113 serves to rotate the latter and delivery arm to initial position when cam arm 119 clears pin 120. A spring 122 around shaft 113 serves to lower the latter shaft and hold its conical extremity 123 in engagement with a bearing plate 124 laterally extending from link 116. A stop 125 is located in position to be engaged by projecting pin 120 to arrest the delivery arm in its initial position in register with the center of the turntable.

Figure 1:
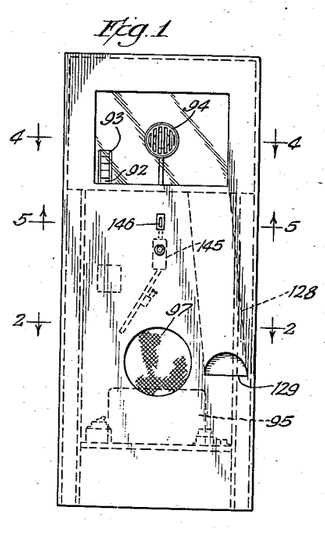
Fig. 1 is a front elevation of the apparatus and its housing.
Figure 2:
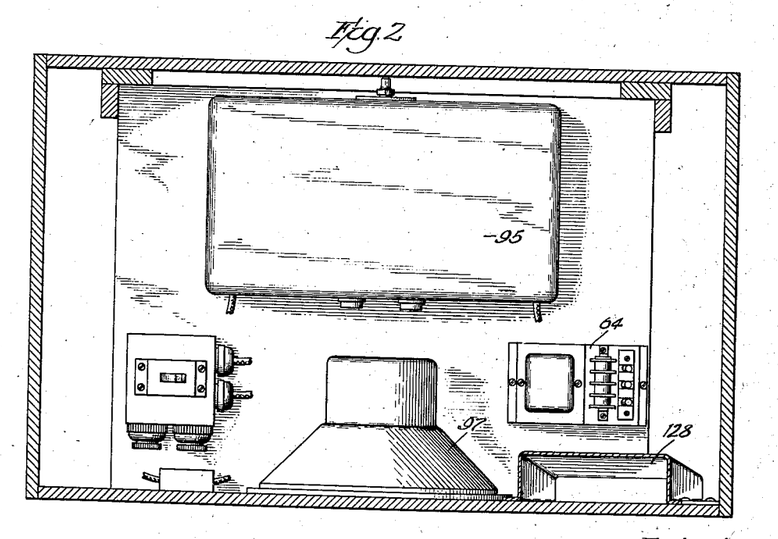
Fig. 2 is a plan section taken on the plane 2—2 of Fig. 1.

The lifting magnet 112 is energized and de-energized by switch 9 (Fig. 14) and its controlling cam 126 in phase with the operation of delivery arm and its operating mechanism. This magnet is energized by direct current from the rectifier 64 just before elevation of the delivery arm and remains energized until the delivery arm carries the record to the delivery point 127 at which time it is deenergized to release the record. In the present case the released record slides down the chute 128 (Fig. 4) and issues at 129 (Fig. 1) in position to be grasped by the operator.

The shavings or cuttings 130 created by the cutting action of the stylus 36 on the record are removed by mechanism in this instance associated with the record delivery mechanism. The cuttings are thread-like in character, generally being continuous. As they leave the stylus they fall coiled loosely on the central blank portion of the disc around the magnet 112 whose exterior in this instance is cylindrical (see Fig. 12). Upon completion of the recording operation, the stylus is raised from the record and moved outwardly towards initial position. In doing so, the stylus tends to carry a portion of the thread-like cuttings outwardly, thereby pulling the coil of cuttings against the surface of magnet 112 with the result that the continued rotation of the turntable wraps the coatings rather closely around the magnet, pulling them away from and clearing the stylus. The cuttings are then carried with the record as it is removed from the turntable for delivery.

Means in the form of a stripping device 131 is advantageously provided for stripping the cuttings from the magnet 112 and allowing the same to fall with the record clear of the phonograph mechanism. The stripping device is here shown in the form of a ring closely surrounding the magnet and slidable thereon from the idle position shown in Fig. 12 to the discharge position shown in Fig. 11. Preferably the underface 132 of the stripping ring is bevelled to aid in concentrating the cuttings around the lower portion of the magnet.

The stripper actuating mechanism is here shown in the form of a lever 133 carried with and pivoted on arm 111 at 134. The forward end 135 of lever 133 is adapted to engage a yoke 136 on stripping ring 131 and to depress the same, against the tension of spring 137, from its upper position (Fig. 12) to its discharge position (Fig. 11). The end of the lever is forked at 138 to straddle the non-circular stud 139 projecting above the magnet and by means of which the yoke 136 is prevented from rotating relatively to the lever 133.

Lever 133 is actuated in this instance by the stationary cam 140 upon which the lever roller 141 rides as the record is moved to delivery position to depress stripping ring 131 to discharge the cuttings 130 in the manner illustrated in Fig. 11.

The operation of the blank record carrier 49 is synchronized to carry a record from the magazine to the turntable while the delivery carrier 111 is removing a record from the turntable and discharging it at the delivery point. The operation of these carriers occurs, therefore, substantially simultaneously, thereby minimizing loss of time in supplying a record blank upon the completion of the previous record. This is important where the sound to be recorded requires more than a single record.

The turntable is advantageously provided with a depressible driving pin 142 adapted to enter an eccentric hole 143 in the record blank to insure driving of the record with the turnable. For this purpose the record blanks are, therefore, provided with the eccentric driving hole located at a radial distance from the center equal to that of driving pin 142. The pin is depressed, when the record blank is placed on the turntable, against a light spring 144. Upon rotation of the turntable, the inertia of the record generally causes it to slip on the turntable until registry of the driving hole with pin 142 at which time the pin is forced upwardly by its spring to effect a positive drive. This is particularly important for lightweight records.

Figure 3:
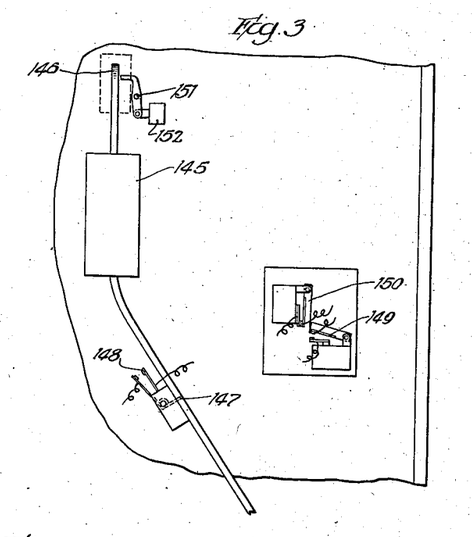
Fig. 3 is a rear elevation of a portion of the apparatus showing the coin controlling devices.

The illustrative apparatus is coin controlled. The deposit of a coin of the proper denomination inaugurates the cycle of operations which continues automatically and concludes with the delivery of a record in the discharge chute. Coin controlling apparatus of standard design available on the market may be employed. Its details form no part of the present invention. Generally the coin controlling apparatus embodies mechanism enclosed in the housing 145 by which counterfeits and coins of improper denomination are by-passed to prevent operation of the mechanism. When a coin of proper denomination is introduced in the coin slot 146 at the front of the apparatus, it passes through the mechanism 145 and engages an actuating lever 147 to close relay switch 148. Momentary closing of the latter energizes "starting" relay 149. The latter is then held in "closed" position by the "stopping" relay 150 (Fig. 3) which swings outwardly and mechanically holds relay 149 closed. Subsequent opening of switch 148 does not, therefore, interrupt operations. Starting relay 149 remains closed until the stopping relay 150 is energized to clear relay 149 and permit the same to open.

Coin slot 146 is in this instance provided with means 151 (Fig. 3) for closing the slot when the blank record magazine is energized. The closing means is actuated by magnet coil 152 connected in parallel with the "magazine empty" signal and is energized by micro-switch 90.

As stated earlier, switches 1 to 12 which control the electrical functions of the apparatus are opened and closed in proper sequence by cams (see Fig. 7) mounted on auxiliary control shaft 62 which rotates in phase with control shaft 42. As above pointed out, the latter shaft operates and synchronizes the operation of the several mechanical functions of the apparatus. Control shafts 42 and 62 are, in the present apparatus, driven by a synchronous motor 153 through reduction gearing 154 and 155 designed to rotate the shaft at the desired speed and, in this instance, through only a single revolution during the entire cycle of operations of the apparatus. The mountings for motor 153 and also motor 22 are preferably cushioned either by soft rubber or springs to dampen both mechanical vibration and magnetic vibration caused by the alternating current. Vibration of any character is likely to be picked up and amplified by the recording or play-back mechanism. Separate, though coordinated, control of the various operations, by the switch cams and cam control switches on control shafts 42 and 62, makes each operation independent of the preceding operation, thereby greatly simplifying control and synchronization of the various operations.

Figure 16:
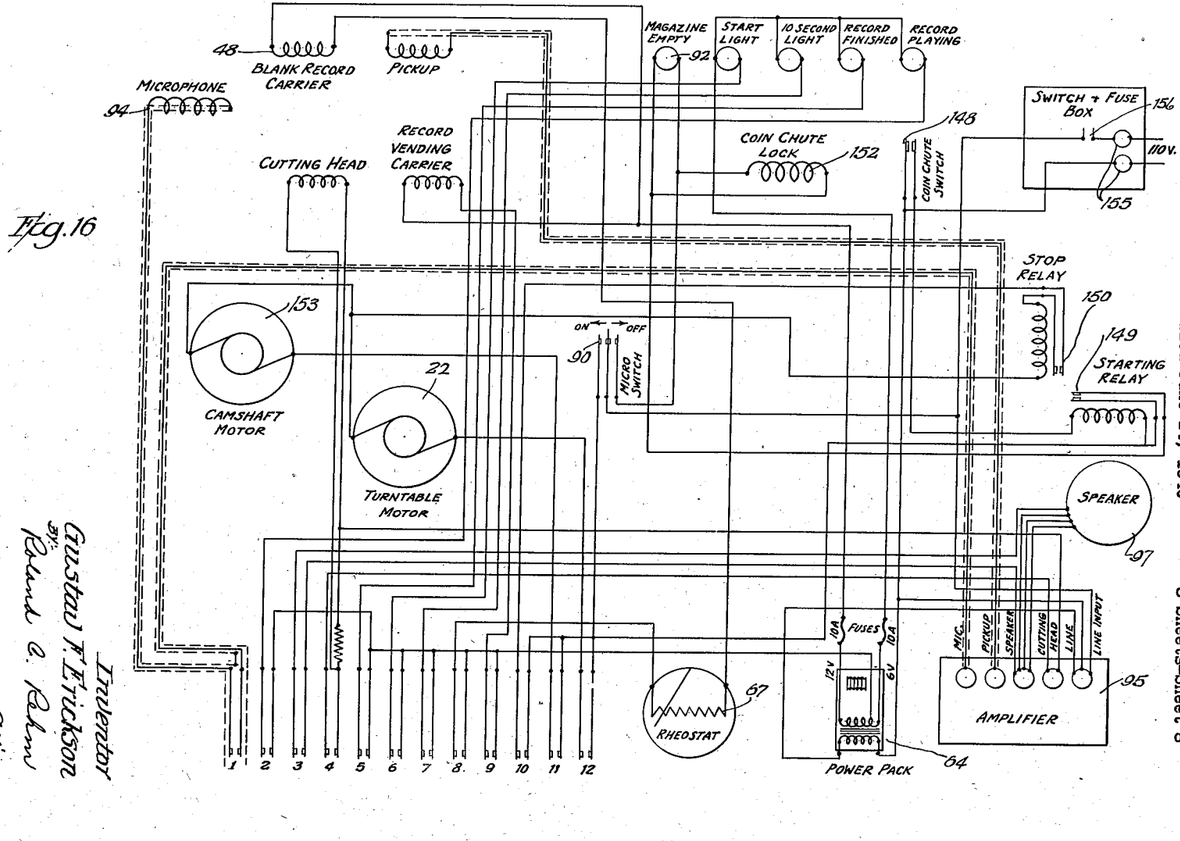
Fig. 16 is a diagram of the actuating and controlling circuits.

The diagram of Fig. 16 illustrates the control and synchronization of the operation of the various elements of the apparatus. Power in this instance is furnished by commercial 110 volt alternating current supply, the lines being provided with the conventional main fuses 155 and main switch 156. The turntable and cam shaft motors 22 and 153 and the record-making and "play back" mechanism are operated with 110 volt alternating current. The diagram is supplied with descriptive legends and reference characters, and detailed tracing of the several circuits will, therefore, be unnecessary. A brief catalog of sequence of operations will suffice:

Upon deposit of an appropriate coin in the coin slot 146, switch 148 is momentarily closed. This switch then energizes the "starting" relay 149 and its switch, the latter being held closed as above pointed out by the opening of the "stopping" relay 150. Closing of the starting relay starts cam shaft motor 153, its controlling switch 11 being already closed. Rotation of the control shaft 42 and 62 thus inaugurates the several operations of the apparatus: A blank record having already been placed on the turntable (during the delivery of the previous completed record), the turntable motor is started through closing of its switch 12, micro-switch 90 being in "on" position, assuming that the magazine contains some records. The cutting head is also lowered on the record and its circuit energized through closing of its control switch 4. Microphone switch 1 is also closed. (In this connection it should be noted that the microphone and pick up circuits are shielded by metal shields which, in the conventional manner, form a portion of the circuit.) At that time the "start" signal is lighted (by the closing of its switch 6) and the operator then delivers to the microphone the sound to be recorded. The apparatus advantageously is provided with a warning signal (here designated as a "10 second" signal) which notifies the operator of the approaching termination of the recording period. Such signal is in the form of a light illuminated at the proper time by the closing of switch 7. At the end of the recording time, a further signal (designated as "record finished") notifies the operator of the end of the recording period. This signal is displayed upon the closing of switch 5.

Upon completion of the record the cutting head is raised and the "play back" arm lowered upon the record. Thereupon a "record playing" signal is displayed (by the closing of switch 2). The "pick-up" is amplified in the amplifier and delivered through the loud speaker or other appropriate receiver. Upon completion of the "play back," the pick-up arm is elevated and the delivery magnet 112 is energized by the closing of switch 9. This switch remains closed until the delivery arm reaches delivery position, at which time switch 9 opens and the record is released into the delivery chute. The delivery arm is then returned to initial position and centered on the blank record which has just been placed on the turntable by the blank record carrier. Upon the beginning of the operation of the latter carrier, its electromagnet is energized by closing of its control switch 8 and remains energized until the blank record is centered on the turntable. The carrier arm then returns to its position over the magazine. The "stop relay" is then energized through the closing of switch 10 with the resultant opening of starting relay and the stopping of cam shaft motor 153.

The record is of such character that it may safely be sent through the mail in an appropriate mailing envelope. It may carry messages now transmitted by letter and indeed it may be prepared much more quickly and at less cost than a typewritten letter. The fidelity with which it is now possible to record the voice makes such a record even more authentic than a signed letter. If desired, the apparatus may be enclosed in a soundproof booth which insures privacy in the making of the record.

The invention has, of course, a variety of uses and is not limited to the details of the illustrative apparatus. Moreover it is not indispensable that all features of the invention be used conjointly since various features may be employed to advantage in different combinations and subcombinations.

Having described my invention, I claim:

1. In a phonograph the combination comprising recording mechanism including a cutting stylus, a transfer arm adapted to lift and remove a completed record from the recording mechanism, said arm having a device in engagement with the record about which the cuttings from the stylus wind, and means operative on the removal of the record for discharging the cutting from said device.

2. A phonograph comprising in combination a magazine adapted to hold a stack of record blanks, each having a magnetic portion, recording mechanism including a turntable, a transfer arm having an electromagnet adapted to attract the magnetic portion of a record blank, means for elevating said arm to lift the record from the magazine and for moving the arm laterally to carry the record to the recording mechanism, and means for controlling the magnetic field of said magnet to limit its lifting power to a single record.

3. A phonograph comprising in combination recording mechanism including a record cutting stylus, automatic means for removing a completed record from the recording mechanism, and a device operating with said record removing means for accumulating and removing the stylus cuttings from said recording mechanism.

4. A phonograph comprising in combination recording mechanism including a turntable and cutting stylus which in operation forms an elongated thread-like cutting, a transfer arm for removing a record from the recording mechanism, and means associated with said arm for discharging the shavings formed by the cutting stylus.

5. A phonograph comprising in combination a magazine holding a plurality of record blanks stacked one in contact with the other, said records being made of thin sheet material, each having a centering hole and the central upper surface thereof being magnetic, recording mechanism including a turntable, record transfer mechanism including an electromagnet adapted to attract the magnetic portion of the upper record blank for lifting a record from the magazine and transferring the same to the turntable, and means for controlling the magnetic field of said magnet to limit this lifting power to a single record.

GUSTAV F. ERICKSON.